US008968158B2

(12) United States Patent
Poli

(10) Patent No.: US 8,968,158 B2
(45) Date of Patent: Mar. 3, 2015

(54) DEVICE FOR STRESSING AND TRAINING THE JOINTS AND MUSCLES OF THE HAND, WRIST AND FOREARM

(76) Inventor: Tiziano Poli, Seregno (IT)

( * ) Notice: Subject to any disclaimer, the term of this patent is extended or adjusted under 35 U.S.C. 154(b) by 1067 days.

(21) Appl. No.: 12/864,815

(22) PCT Filed: Jan. 27, 2009

(86) PCT No.: PCT/IB2009/050334
§ 371 (c)(1),
(2), (4) Date: Nov. 8, 2010

(87) PCT Pub. No.: WO2009/095861
PCT Pub. Date: Aug. 6, 2009

(65) Prior Publication Data
US 2011/0045953 A1  Feb. 24, 2011

(30) Foreign Application Priority Data
Jan. 28, 2008  (IT) .............. MI2008A0119

(51) Int. Cl.
*A63B 23/14* (2006.01)
*A63B 23/16* (2006.01)
*A63B 21/02* (2006.01)
*A63B 21/06* (2006.01)
*A63B 24/00* (2006.01)
*G09B 15/06* (2006.01)

(52) U.S. Cl.
CPC .............. *A63B 23/16* (2013.01); *A63B 21/023* (2013.01); *A63B 21/06* (2013.01); *A63B 24/00* (2013.01); *G09B 15/06* (2013.01); *A63B 2209/10* (2013.01); *A63B 2210/50* (2013.01); *A63B 2220/833* (2013.01)

USPC ............................................... 482/47; 482/46

(58) Field of Classification Search
CPC .. A63B 21/023; A63B 21/04; A63B 21/0442; A63B 21/06; A63B 21/1434; A63B 21/1438; A63B 21/1442; A63B 21/1465; A63B 21/1469; A63B 21/151; A63B 23/14; A63B 23/16
USPC ........... 482/44–50, 92–94, 98–103, 121, 126, 482/129–130, 133–139; 601/23, 40
See application file for complete search history.

(56) References Cited

U.S. PATENT DOCUMENTS 3,294,399 A * 12/1966 Cugliari ........................ 482/94
3,782,719 A *  1/1974 Kuhlman ...................... 482/48
3,871,646 A *  3/1975 Slack .............................. 482/48

(Continued)

FOREIGN PATENT DOCUMENTS

| DE | 16 546 C | 6/1881 |
| WO | 90/07957 A1 | 7/1990 |
| WO | 01/72381 A1 | 10/2001 |

*Primary Examiner* — Oren Ginsberg
(74) *Attorney, Agent, or Firm* — Sughrue Mion, PLLC

(57) ABSTRACT

A device (10) for stressing and training the joints and muscles of the hand, wrist and forearm, usable by an individual in order to develop each single muscular group involved in the movement of each finger of the hand, comprising a horizontal support plane or base (11) to which a vertical column (16) is associated and means suitable for allowing the movement of one or more fingers (15) of the hand (14) either at the same time or in an alternate way and according to a plane both horizontal and vertical against a resistance, in which a support element or block (12) for the metacarpus placed onto said plane (11) is provided.

8 Claims, 8 Drawing Sheets

(56) References Cited

U.S. PATENT DOCUMENTS

| | | | |
|---|---|---|---|
| 4,455,019 A | 6/1984 | Harris | |
| 5,303,696 A * | 4/1994 | Boice | 601/33 |
| 5,451,191 A | 9/1995 | Beenken | |
| 5,533,949 A * | 7/1996 | Hwang | 482/47 |
| 5,738,613 A * | 4/1998 | Clayton | 482/47 |
| 6,142,919 A * | 11/2000 | Jorgensen | 482/121 |
| 6,951,529 B1 * | 10/2005 | Ware | 482/47 |
| 7,857,778 B2 * | 12/2010 | de Muinck | 602/32 |
| 7,935,026 B2 * | 5/2011 | McSorley | 482/48 |

* cited by examiner

DEVICE FOR STRESSING AND TRAINING THE JOINTS AND MUSCLES OF THE HAND, WRIST AND FOREARM

CROSS REFERENCE TO RELATED APPLICATIONS

This application is a National Stage of International Application No. PCT/IB2009/050334 filed Jan. 27, 2009, claiming priority based on Italian Patent Application No. MI2008A000119 filed Jan. 28, 2008, the contents of all of which are incorporated herein by reference in their entirety.

TECHNICAL FIELD

The present invention refers to a device for stressing and training the joints and muscles of the hand, wrist and forearm of an individual.

More particularly, the present invention refers to a device for stressing and training the joints and muscles involved in the movement of the single fingers of the hand, of the wrist and of the forearm of an individual.

There are many human activities in which stressing and training the joints and muscles of the hand, wrist and forearm is advantageous. For instance, the movements performed by the fingers of the hand of a musician, for instance a pianist, a violinist or the like, of a surgeon, of a typist, of a juggler or even of an individual who suffered a traumatic or neurological damage are to be considered. Depending on the activities, such movements must be quick and precise and the fingers of the individual must have a sufficient muscular tone and relaxation rapidity.

In the specific case of the piano technique, a great care has to be addressed to the anatomic functioning of the hand; this because a precise and sensitive control of the movement of each single finger of the hand of the individual is a basic requirement for a high level piano and artistic performance and, therefore, for obtaining agreeable and refined resonances.

KNOWN ART

A known method used for training the muscles and joints of the fingers of the hands and/or of the wrist consists in using a little ball of a deformable material; said little ball, held in the hand palm, is deformed by means of the force exercised by the fingers of the hand itself. Such kind of exercise involves, however, the use both of the muscular groups belonging to the hand fingers and of accessory and assistant muscular groups having the duty of increasing the produced force. The use of the little ball of a deformable material, setting in action at the same time both the flexor muscles of the fingers and the flexor muscles of the hand palm, that is the assistant muscles, allows to develop a lot of force with the drawback, however, of limiting the agility and the rapidity of the movement of the fingers themselves and, above all, of not allowing the isolated control of each single muscular group, which is a necessary condition for being able to train the movement agility and rapidity of each single joint forming the finger of a hand.

Specific devices for training the hand musculature are also known in the art.

WO 90/07957 discloses a device for developing the muscular ability of the fingers of a hand, which can be used in the medical and physiotherapical field, for the gait rehabilitation, and in the musical field for training the fingers of pianists and musicians in general.

U.S. Pat. No. 3,782,719 discloses a device for exercising the movement of the fingers of a hand and particularly for reinforcing the musculature of the fingers and of hand portions that suffered a trauma.

The conventional techniques for stressing and training the joints and muscles of the hand, wrist and forearm of an individual, employed in the mentioned known devices, involve however to stress the accessory or antagonist muscles and, therefore, they have the drawback of not allowing the achievement of a natural action without strain and of developing a motor activity according to the anatomic (muscular dissociation) and mechanical laws on which the movement of the hand fingers, of the wrist and of the forearm are based.

This drawback turns out to be particularly felt in the case of the pianists, who have to develop movement agility and easiness, and in any case in all those situations in which the development of these two aspects is particularly important.

A further drawback of the above-mentioned conventional techniques is connected to the fact that they cause the generation of a muscular strain higher than needed. In the specific case of the pianist, this excessive muscular strain results in needing a big quantity of study hours, so as to be able to develop that movement precision and rapidity distinctive of a quality "piano technique".

A first object of the present invention is to provide a device allowing to solve the problem of how obtaining the optimum stressing and training of the joints and muscles of the hand, wrist and forearm, without the drawbacks of the known art.

Another object of the invention is to provide a device of the aforesaid kind, which can be effectively used by the musicians, and particularly by the pianists, to develop their piano technique.

Last but non least object of the invention is to provide a device of the aforesaid kind being of simple realisation and that, therefore, can be industrially obtained at limited costs. These and other objects are achieved by the device for stressing and training the joints and muscles of the hand, wrist and forearm, as claimed in the appended claims.

DISCLOSURE OF THE INVENTION

Advantageously, the configuration of the device according to the invention and particularly the provision of a support element for the metacarpus, which extends perpendicularly with respect to the support base, allow to obtain the arrangement necessary to cause that muscular dissociation condition, required to exercise a precise control of the movement of the joints and muscles of the hand, wrist and forearm. The device according to the invention therefore allows to stress and train the joints and muscles of the hand, wrist and forearm actually responsible for a given movement, without turning to the help of accessory or antagonist muscular groups.

Thanks to the fact that the device of the invention allows to teach and/or to re-educate the correct muscular actions, involving only the necessary muscular bundles and not other muscles that increase the produced force but reduce, at the same time, the muscle contraction speed and/or the movement precision respecting the limb natural physiology, the optimum mobility of the joints of the hand, wrist and forearm can be advantageously developed.

Advantageously, according to the invention, the autonomous control of each single muscular group can be obtained, which is the necessary condition for being able to acquire a movement agility of each single joint, which forms the finger of a hand.

The invention turns out to be particularly advantageous in the musical field where the currently used conventional study techniques do not allow to obtain the aforesaid muscular dissociation; as a consequence of this, today is therefore extremely difficult to exercise a precise and sensitive control also of the little movements of the fingers, which is the necessary condition for a good technical and artistic performance. On the contrary, thanks to the device according to the invention, it is advantageously possible to obtain, for instance in the specific case of the piano players, a right muscular approach in order to tackle, without exhausting hours of exercise, the virtuosistic study of the instrument.

BRIEF DESCRIPTION OF THE DRAWINGS

The constructive and functional features of the device for stressing and training the joints and muscles of the hand, wrist and forearm of the present invention will be better understood from the following detailed description, in which reference is made to the attached drawing tables representing some non-limiting preferred embodiments thereof and in which.

DETAILED DESCRIPTION OF THE INVENTION

Figure 1:
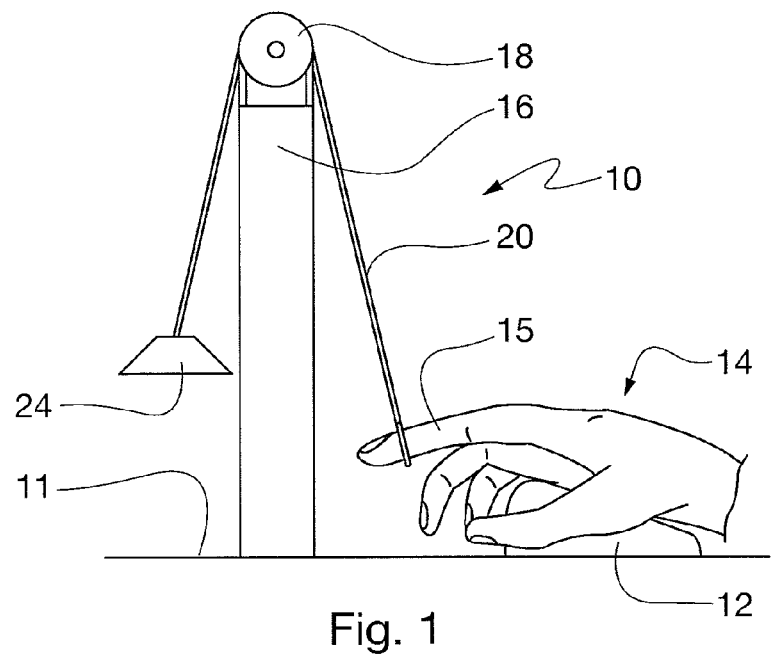
FIG. 1 schematically represents a side view of a first embodiment of the device for stressing and training the joints and muscles of the hand of the present invention.
Figure 2:
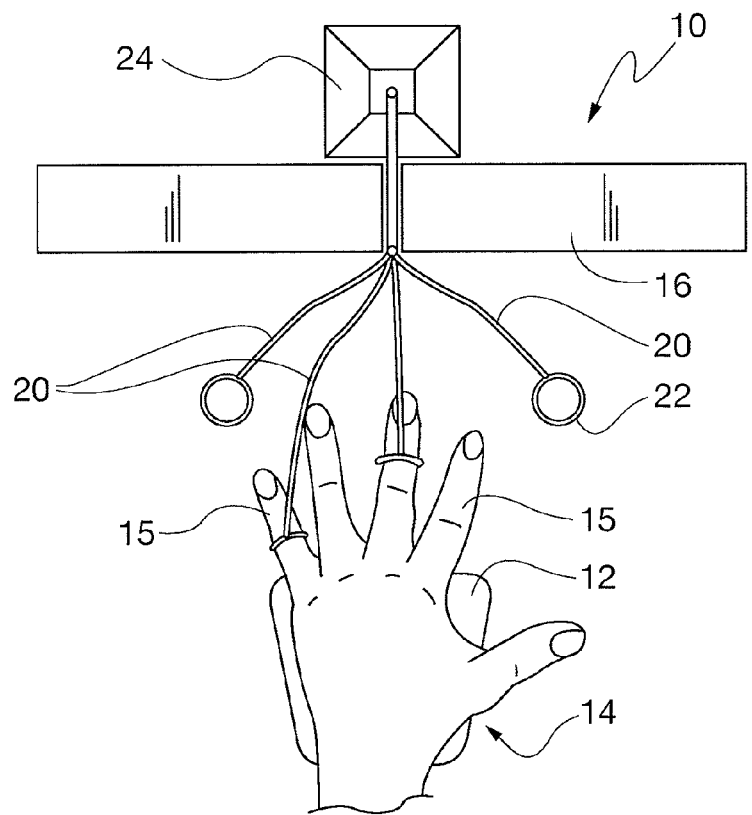
FIG. 2 represents a top schematic view of the device of FIG. 1.

With reference to FIGS. 1 to 5 the device for stressing and training the joints and muscles of the hand, altogether denoted with the reference 10, comprises a support or backing element or block 12 arranged on a support plane or base 11 and perpendicularly extending with respect to said plane, having the function of defining a support for the hand 14 of the individual, according to the modes that will be discussed later on.

Said element 12, in the preferred embodiment according to the figures, perpendicularly extends with respect to plane 11, for instance of 2-5 cm, and has a side section profile shaped basically as a wedge and is made of plastic material, wood, or of other known kind; according to the invention, the wedge conformation of the element 12 allows to support the hand metacarpus allowing, in this way, the wrist and the forearm to remain naturally supported on the horizontal plane 11. Said element 12 extends in parallel to the plane 11 of some cm, for instance 2-8 cm, so to leave a sufficient space for supporting the wrist and the forearm on the plane 11, which has, on the contrary, a development of some tens of cm, for instance 30-50 cm.

Moreover, said element 12 is preferably movable and can be replaced with a similar element having different height and/or shape to adapt the device to different users and/or exercise to be performed with the device.

Moreover, said element 12 can be preferably arranged, with respect to said plane 11, in different configurations thanks to engagement means allowing to removably fix the element 12 with respect to the plane 11.

The same support element 12 can have an ergonomic conformation so as to be able to adapt in an optimum way to the conformation of both the right hand and the left hand; the same support block can be covered with a soft material in order to give the laid hand and/or the forearm a greater comfort.

Moreover, the support element 12 is such as to be able to adapt to the support of both the palm and the back of the hand to carry out the movements of which explanation will be given later on.

Thanks to the support element 12 for the metacarpus, the hand fingers can be activated without any participation of the accessory muscles of the fingers themselves, such as for instance the palm flexor. It has been indeed checked that the isolation of the fingers action from the palm flexor action is the fundamental condition to assure to the fingers a precise movement and completely under the control of the individual's will, and it is the basic condition for the development of the movement agility and speed of the fingers and of the joints in general. Advantageously, thanks to the muscular dissociation obtained with the device according to the invention, the training for the precise movement of each joint of the hand can be achieved, without the participation of other accessory joints.

The device of the invention further comprises a column 16 placed in face of the element 12 and, therefore, of the hand 14 when the device is in use; said column 16, which is fixed, preferably in a removable way, to the horizontal support base or plane 11 and rises in a substantial perpendicular way to it, has, preferably on its top, at least a pulley 18 suitable for allowing the sliding of at least a cord or wire 20.

At the end of each cord 20, facing the direction of the hand 14 and of the support element 12, at least a ring or eyelet 22, 22' is fixed inside which, respectively, the fingers 15 of the hand or the wrist 13 of the individual are inserted, to carry out the purposes and the movements that will be discussed later on.

At the second end of the cord 20, facing the direction opposite to the hand 14, a weight 24 is fixed, preferably interchangeable so that the mass can be varied depending on the required strain and on the typology of the exercise to be performed.

The position of the element 12 on the horizontal plane 11 relative to column 16 can be adjusted, by bringing the element nearer or moving it away from the same, so as to adapt to the characteristics of the hands of the different individuals using the device.

The rings 22 and 22' are preferably made of elastic plastic material or they can be manually adjusted so as to be able to easily adapt to the different diameter sizes of the fingers and of the wrist of the single individuals; the same rings or eyelets can be also defined by hook-and-loop strips to be wound on the finger or on the wrist or on the metacarpus depending on the typology of the exercise to be performed.

As an alternative, the weight 24 can be replaced with a spring, for instance an helical spring and in case having a variable resistance, tied either to the cord 20 itself and to the support plane 11 of the device of the invention or to the column 16 thereof or the weight itself can be replaced by a gas spring or by an equivalent kind of actuator, preferably configured so as to allow the regular and not in jerks execution of the movement of the fingers or of the wrist of the hand.

According to the invention, it is also possible to provide that the cord 20 is partially wound around the pulley 18, which in this case is in its turn equipped with an adjustable clutch mechanism, suitable for allowing the variation of the strain that the movement of the finger or of the wrist can exercise according to the modes described hereinafter.

The cord 20, in an alternative embodiment, can be replaced with a mechanical lever.

Such weights or springs or actuators and the relevant sliding system of the cord 20 can be arranged also according to a horizontal direction relative to the plane 11, for instance by mounting the axis of the pulley 18 rotated of 90° with respect to the arrangement shown in FIG. 1, to allow the execution of further exercises.

Figure 6:
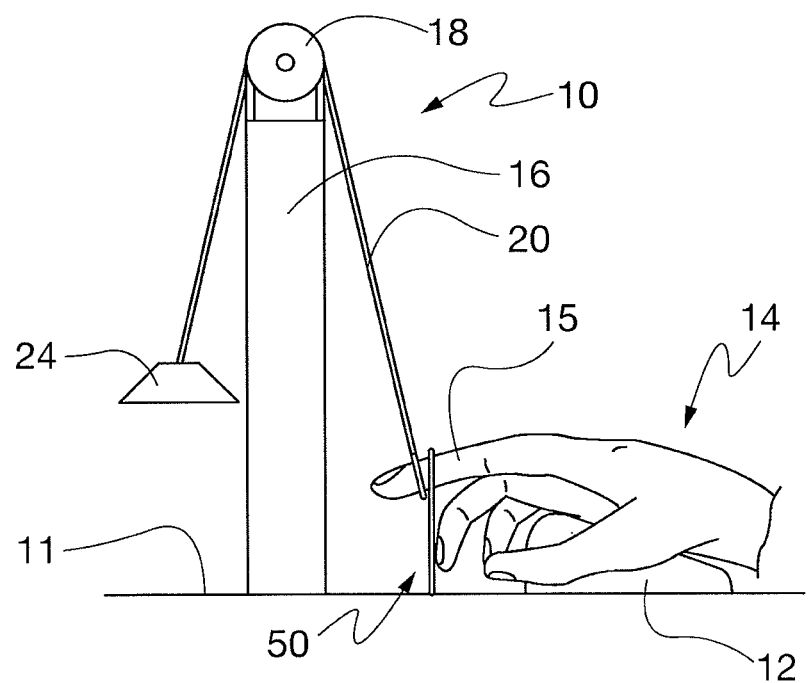
FIGS. 6 and 7 schematically represent a further way of using the device of FIG. 1 with an accessory.
Figure 7:
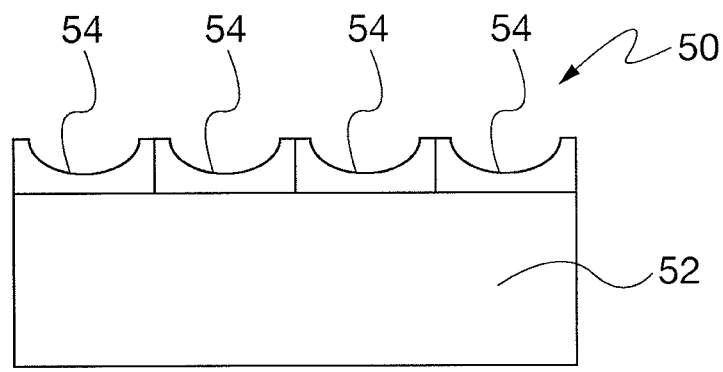

With reference to FIGS. 6 and 7 a possible support 50 is illustrated, said support defining an accessory with which the device of the invention is equipped and suitable for carrying out the purposes that will be detailed later on.

Said possible support 50 is defined by a plate-shaped element 52 fixable and removable with respect to the plane 11 in a known way and located between the column 16 and the element 12; the position of the possible support 50 relative to the column 16 is adjustable so to be able to adapt to the fingers of the hand.

The upper portion of the plate-shaped element 52 has at least a groove 54 with a basically curvilinear profile suitable for housing or supporting the finger of the hand allowing the movement of a single phalanx; said portion of the finger 15 is stabilised at the groove 54 of the possible support 50 by means of a possible hook-and-loop band, or an elastic or otherwise known band (not shown in figure).

The vertical position of the groove 54 is adjustable so as to be able to adapt to the different hand typologies of the users who employ the device of the invention.

In the preferred embodiment shown in FIGS. 6 and 7, the possible support 50 comprises four groves 54 so as to be able to exercise many fingers 15 of the hand 14 in either a contemporary and/or an alternate way.

Referring now to FIGS. 8 to 15, it is illustrated a second embodiment of the device according to the invention in which the same numeral references have been used to denote the same or similar parts as to the first embodiment.

Advantageously, according to this second embodiment of the invention, the plane 11 comprises two portions 11a and 11b hinged to each other in 11c and the column 16 is hinged in its turn in 11d to the front portion 11a of the plane 11 so that, in all, the device 10 can take a rest folded position and a working extended position in which the column 16 is brought in the upright position with respect to the plane 11.

Also in this embodiment of the invention, the support element 12 is advantageously adjustable along the plane 11 so as to be able to adapt for supporting both the palm and the back of the hand 14 and to allow to obtain such a muscular dissociation allowing to exercise a precise and sensitive control of the fingers little movements too. For instance, the plane 11 can provide two series of parallel holes 26 suitable for receiving corresponding plugs 27 provided on the support element 12 that can be therefore located at the desired distance from column 16.

Figure 14:
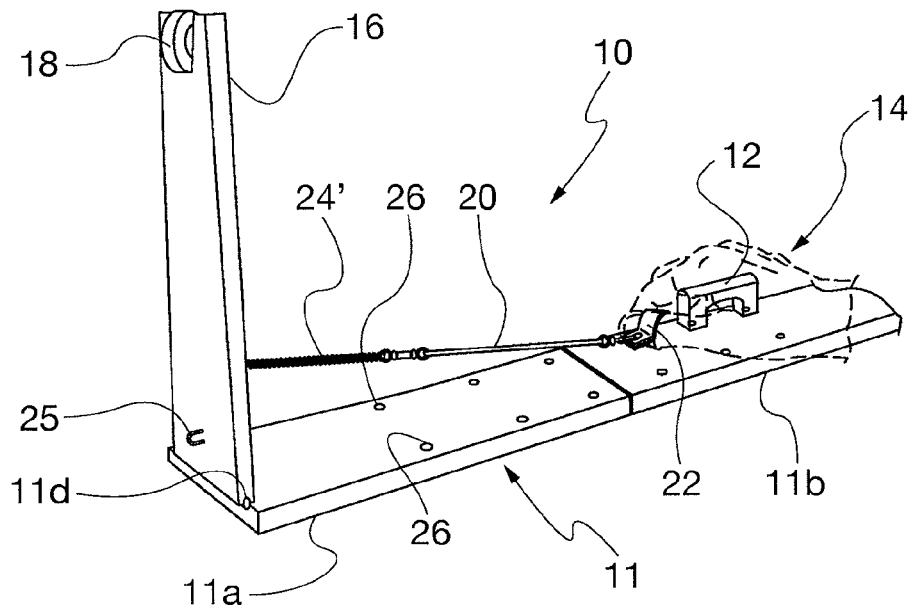
Figure 15:
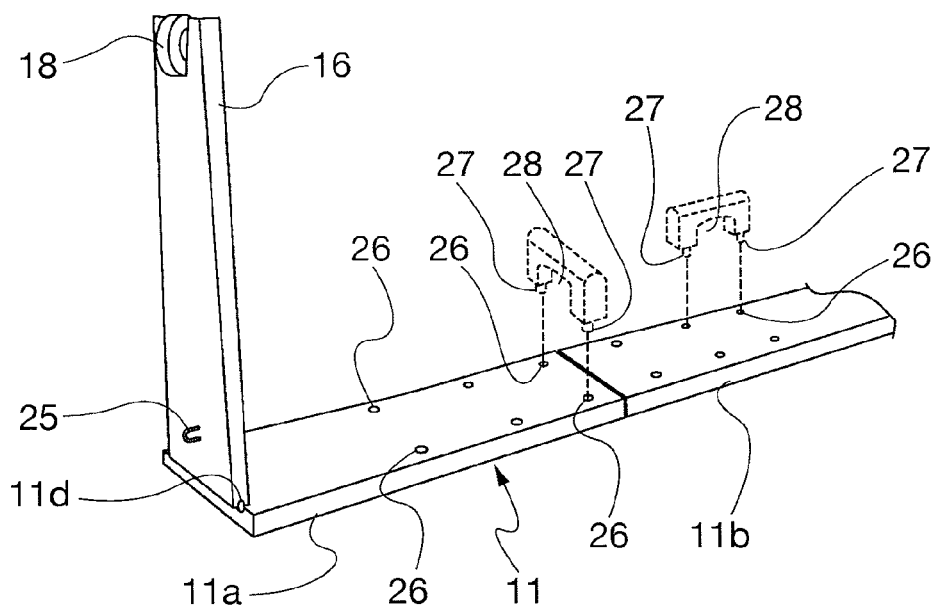

As better visible in FIGS. 14 and 15, thanks to the fact that the pitch between the holes 26 is the same both in the longitudinal and the transversal direction, the support element 12 can be positioned at will on the plane 11 by means of the plugs 27, both longitudinally and transversely, and at the convenient distance from the column 16.

Moreover, the support element 12 can be replaced with another one having an height suitable for the individual's hand and/or the exercise to be performed.

Figure 9:
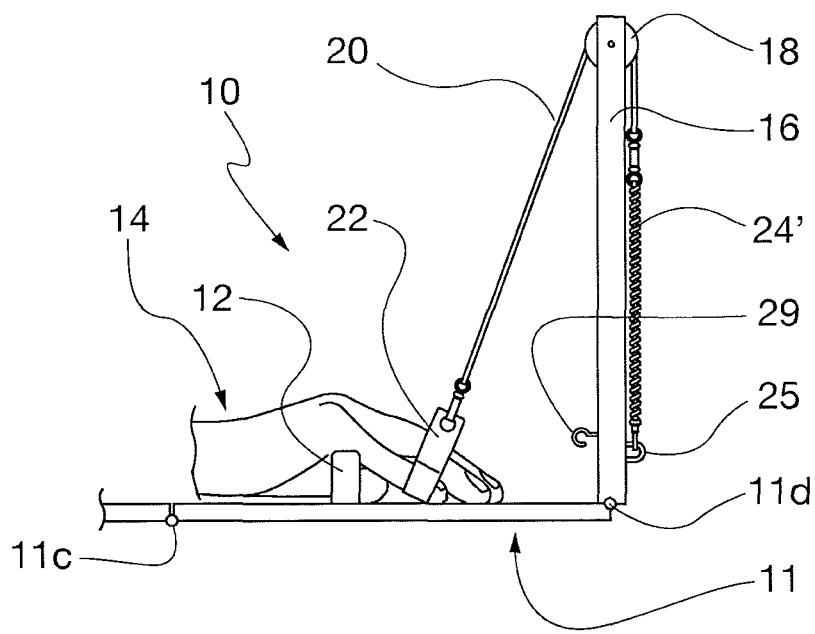
Figure 10:
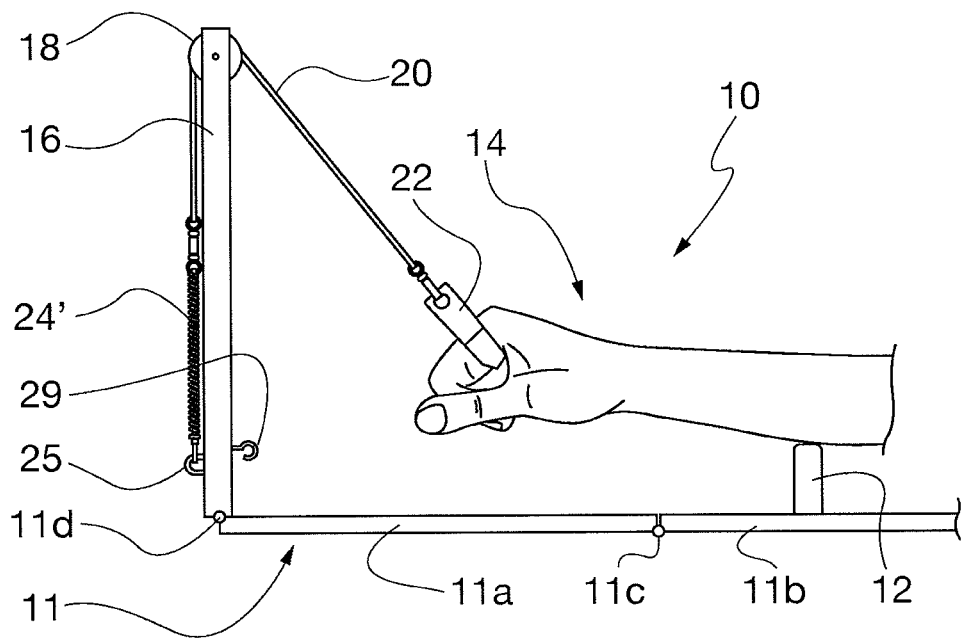
Figure 11:
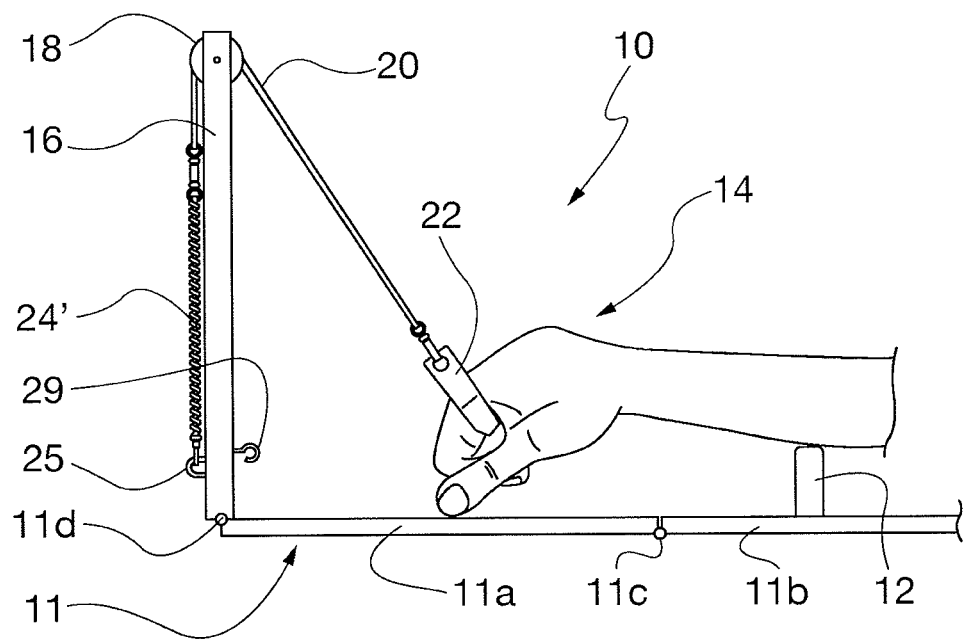

According to this embodiment, the element 12 has a vertical development of some cm, for instance 2-5 cm, with respect to the plane 11 and it horizontally extends for some cm, for instance 2-3 cm, along the plane 11 so as to allow the support on the plane 11 of the metacarpus (FIGS. 8 and 9) or of the forearm (FIGS. 10 and 11).

Figure 8:
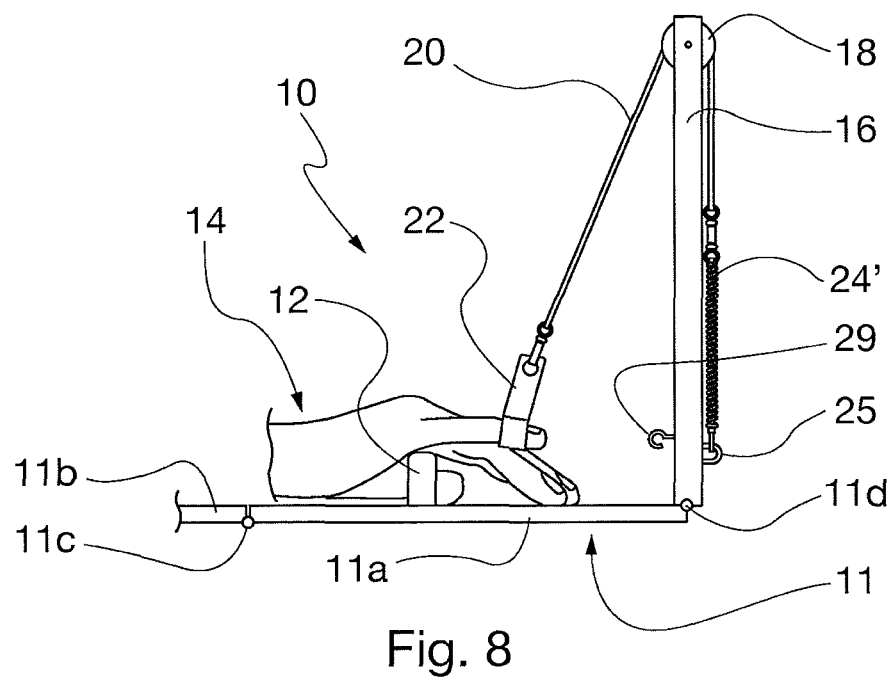
FIGS. 8 to 15 schematically show the device according to a second embodiment, in some ways of usage.

As illustrated in FIGS. 8 and 9, the support element 12 is located on the portion 11a near the column 16; in this configuration, the support element 12 is used for instance for supporting the hand palm and it allows the movement of the fingers in a vertical plane relative to the plane 11. In FIGS. 10 and 11, instead, the element 12 is located on the portion 11b so to be able to be used as a support for the forearm.

Figure 12:
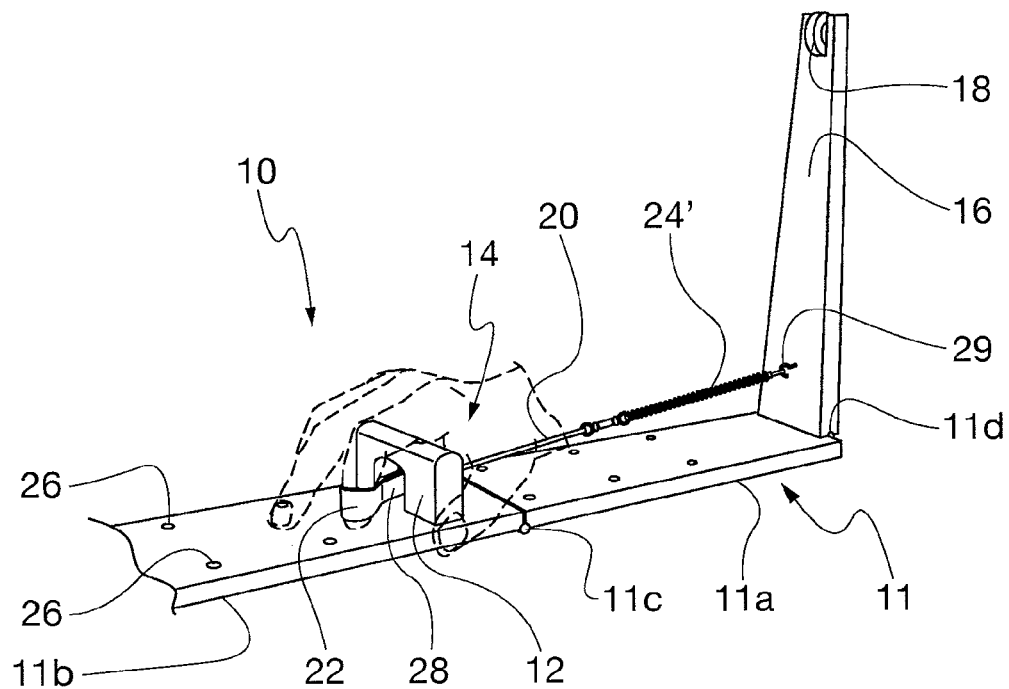

Moreover, the element 12 is preferably provided with a central opening 28 to allow the passage of the cord 20 and the execution, for instance, of movements of the extensor muscles of the fingers, as in the exercise of FIG. 12. To this purpose, the element 12 is advantageously formed with an arched bridge shape.

Figure 13:
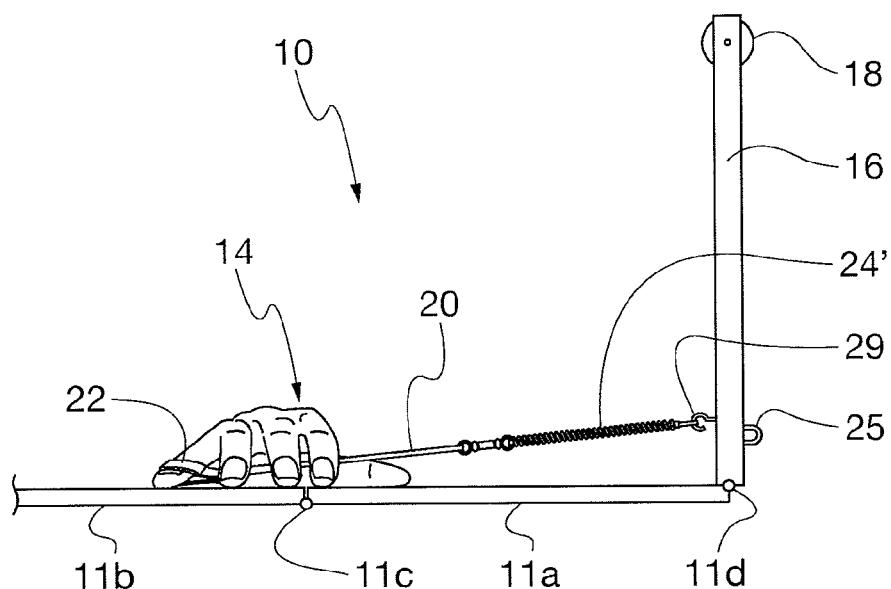

Always according to the invention, it is also possible to remove said element 12 from plane 11 for carrying out exercises not requiring it, as illustrated in the configuration of FIG. 13.

The column 16, at the top end, is provided with a pulley 18 on which a cord or wire 20 slides, which has the free end facing the element 12 provided with a ring 22 and the opposite end hooked to an elastic element 24', for instance a helical spring, fastened to the base of the column 16 on the opposite side with respect to the support element 12 through a hook 25.

In the aforesaid arrangement, the cord 20 is arranged in this way for carrying out exercises providing the arrangement of the cord on a substantially vertical plane.

Moreover, at the base of column 16 is also preferably provided, at the opposite side with respect to the hook 25, a second hook 29 for fastening the spring 24' and the relevant cord 20 for carrying out exercises such as, for instance, those shown in FIGS. 12 to 14, which provides for the arrangement of the cord 20 on a substantially horizontal plane.

By providing a cord 20 sufficiently long it is also possible to use the hook 29 to make the cord 20 return on a horizontal plane, when the spring is fastened to the rear hook 25.

According to the invention, the training for increasing the muscular tone can take place by increasing the resistance to be used. Such target can be obtained both by moving back the support element 12 for the metacarpus with respect to the column 16, and by using greater resistances, for instance by replacing the spring 24' with another one having a greater resistance.

The training can thus advantageously take place at first with a light load, and with slow movements, so as to be able to control that the movement of the involved joint takes place without the help of accessory muscles. The control proves to be simple since, starting from the position with support on the metacarpus and elbow on the surface of the device, the user has to take care of not pressing on the support itself or of not raising the wrist during the action of the fingers.

Advantageously, according to the invention the individual can be educated to the precise control of each joint of the hand, thanks to the position taken by the hand by using the device. Always according to the invention, it is advantageously possible to train the movement speed, that is the development of the contraction speed of each single muscle of the hand and the relaxation rapidity following a muscular contraction.

A further advantage of the invention results from the possibility of making a training directed to increase the muscular tone of each single muscle involved in the manual action.

The device of the invention can be completely mechanical with the adjustment of the strain manually carried out by the user.

The same device can have an electronic control automatically adjusting the intensity of the strain as well as the right execution of the movement.

Figure 16:
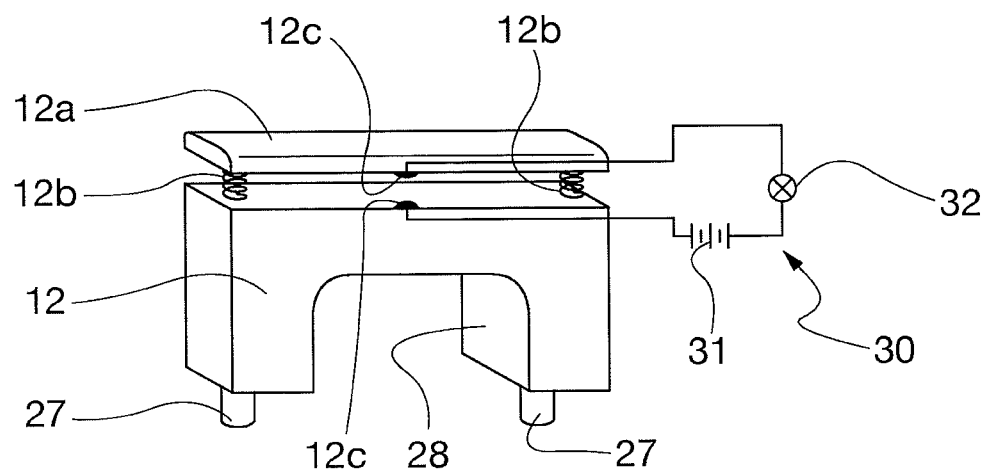
FIG. 16 shows a realization variant of the support element.

In particular, with reference to FIG. 16, a realisation variant of the element 12 is shown, which element 12, in this case, is equipped with an additional support plate 12a associated to the element 12 by means of a couple of helical springs 12b or other elastic means. Between the plate 12a and the element 12 a couple of electric contacts 12c is advantageously provided, associated to an electric circuit 30 supplied by a battery 31 or by network current, and comprising a luminous or acoustic warning device 32.

According to this realisation variant, when a force sufficient to overcome the resistance of the springs 12b is exercised on the plate 12a, the circuit 30 is closed and the warning device 32 is activated. Depending on the elastic resistance of the springs 12b, said condition can denote the achievement of the proper strain (right execution of the exercise) or insufficient strain on the plate 12a.

Moreover, said electric contacts 12c can incorporate a pressure sensor capable of varying an electric parameter, depending on the applied pressure, typically the resistance, so that an electronic control system, associated to the circuit 30, will be able to signal with diversified warning signals whether the pressure applied on the element 12 is sufficient or not; moreover, the electronic control system could allow the user to chose the signalling thresholds depending on the kind of program-exercise to be performed.

The functioning of the device for stressing and training the joints and muscles of the hand according to the present invention, above described in detail with reference to its constitutive particulars, is detailed hereinafter.

In order to completely and accurately detail the functioning of the device according to the invention, a short preamble is made hereinafter, suitable for explaining the movement of the fingers of the hands of the individual.

Each single finger of the hand can move on both the horizontal plane and the vertical plane. The movement of the finger along the vertical plane takes place through the contraction of the flexor muscles (in the approach movement of the phalanx to the hand palm) and of the extensor muscles (in the retreat movement of the phalanx from the hand palm); moreover, the action of the fingers is helped by the interosseous muscles having the function of bending the first phalanx of the finger allowing the other two to remain in extension.

On the contrary, the movement along the horizontal plane occurs through the activation of the dorsal and palm interosseous muscles located in the palm and in the back of the hand. In particular, it is to be noticed that all the three phalanges of the fingers, except the thumb, move along a vertical plane and the first phalanx, connected to the hand knuckle, moves also along a horizontal plane; on the contrary, the first phalanx of the thumb moves along both a horizontal and a vertical plane and in rotation.

The wrist joint can move both along a horizontal plane and along a vertical plane and in rotation.

The forearm joint allows the rotary movement along its own axis and the elbow joint only along the vertical axis.

The device according to the present invention has the surprising result of stressing all the movements that the hand is able to perform. As a matter of fact, said device allows to activate the movement of each single finger of the hand independently from the contraction and activation of the assistant muscles that are responsible for the movement of the joints. In order to exercise the fingers movement and to obtain the dissociation necessary, for instance, for a good piano performance, the hand palm and, particularly, the metacarpus region is in support with the element 12 while the wrist and the elbow are naturally in contact with the horizontal surface, defined by the plane 11.

From this position, with the finger inserted into the eyelet 22 the user exercises the flexion of the finger along a vertical plane producing a pull action on the cord 20 with a strain variable in dependence on the weight fastened to the end of the same one or, in any case, on the resistance applied thereto; with the metacarpus turned upwards (FIG. 4), therefore in a direction opposite to that of the surface of the element 12, the user will exercise the extensor muscles of the fingers.

With the finger hooked to the eyelet 22 as above explained, also the interosseous muscles can be exercised by sideways displacing the finger itself.

Since the device of the invention can be also provided with weights arranged according to a horizontal direction, also the movement according to the horizontal plane can be exercised.

Moreover, the device allows to exercise or train also the joints of the hand thumb, both along a vertical plane and along a horizontal plane as well as both in adduction and in abduction.

Figure 3:
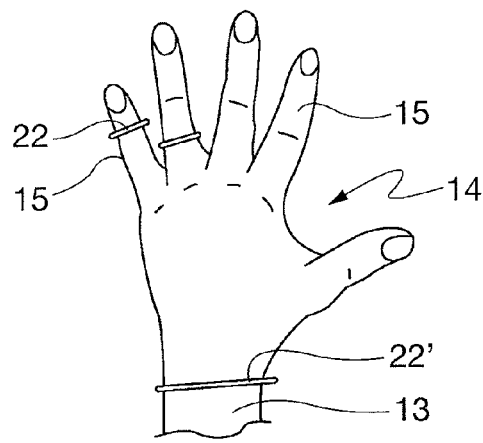
FIGS. 3 to 5 schematically represent some ways of using the device of FIG. 1.
Figure 4:
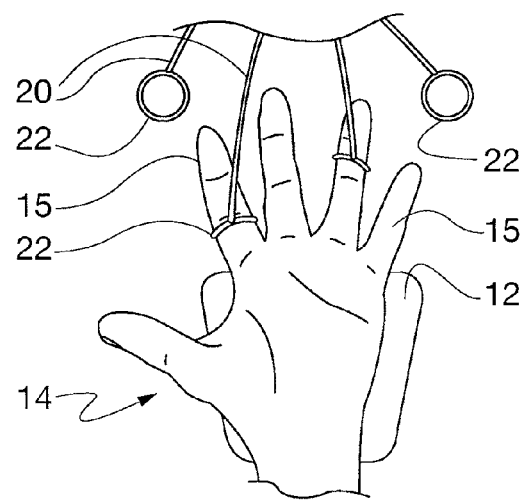

Moreover, by inserting the wrist in the eyelet 22', as shown in FIG. 3, the forearm joint can be trained.

Figure 5:
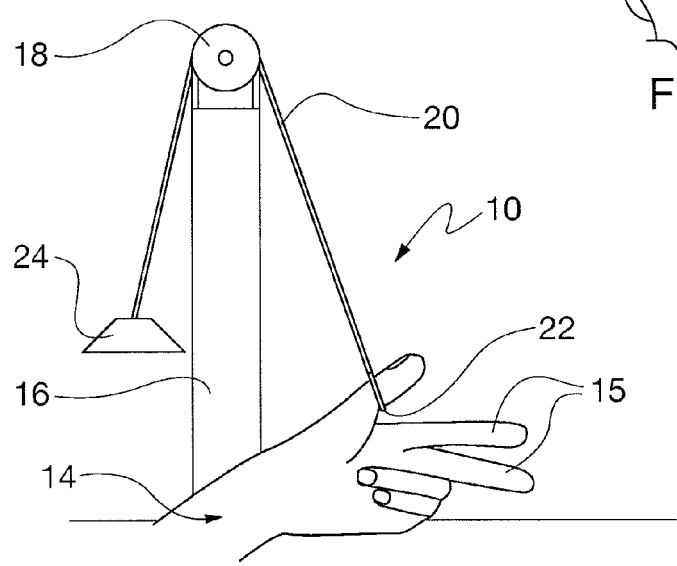

The same eyelet 22', if located at the metacarpus of the hand, allows to train the wrist joint of the hand itself. Moreover, by inserting the eyelet 22 to the thumb or to the little finger of the hand, the device of the invention allows to exercise the pronation movement and the supination movement of the forearm (rotation along the axis of the forearm) as schematically shown in FIG. 5.

Moreover, the device of the invention allows to exercise or train one or more fingers in either a contemporary or an alternate way.

The possible support 50 schematically shown in FIGS. 6 and 7, but applicable to the other embodiments too, particularly illustrated in FIGS. 8-16, as previously said, has the function of limiting the action or the movement of the joint at which the support has been located.

The possible support 50 is used for exercising the joint of the tip of the finger or first phalanx (deep flexor) and it will be consequently positioned at the first phalanx of the finger; on the contrary, to exercise the second phalanx (surface flexor) the possible support 50 will be positioned at the second phalanx.

In this way, the device according to the invention allows to precisely stress all the three phalanges of the fingers and/or the two phalanges of the thumb of the hand independently one from the other and respecting the muscular dissociation.

As it can be noticed from what precedes, the advantages that the invention achieves are evident.

The device for stressing and training the joints and muscles of the hand advantageously allows stressing and training the joints and muscles of the hand actually responsible for a given movement without turning to the help of accessory or antagonist muscular groups. Further advantageous is the fact that the mechanism of the invention allows stressing each single phalanx of the finger of the hand in a completely independent way with respect to the others.

A further advantage of the device of the invention is represented by the fact that, in the specific case of the piano players, it allows to obtain a right muscular approach, respecting the hand physiology, in order to easily tackle the virtuosistic study of the instrument. Further advantageous is the fact that the device of the invention develops the "piano potential" or, in any case, the optimum mobility of the joints of the hand and forearm.

A further advantage is represented by the fact that the device of the invention can be used not only by musicians such as pianists, violinists or the like, but also by all the individuals who need to obtain or to maintain a precise manual ability, such as for instance surgeons, typists, jugglers, conjurers, etcetera. Moreover, the same device can be used by those who need a rehabilitation of the fingers movement in consequence of, for instance, traumatic or neurological damages.

Although the invention has been above described with particular reference to one embodiment thereof, given only by way of non limiting example, many modifications and variants will be evident to a person skilled in the art in view of the above-referred description. Therefore, the present invention intends to include all the modifications and variants forming part of the spirit and of the scope of the following claims.

The invention claimed is:

1. A device for stressing and training the joints and muscles of the hand, wrist and forearm, usable by an individual in order to develop each single muscular group involved in the movement of each finger of the hand, allowing muscle dissociation and comprising:
   a horizontal support base;
   means for allowing the movement of one or more fingers of the hand, either at a same time or at a different time, with respect to a horizontal reference plane and a vertical reference plane, providing a resistance against the one or more fingers;
   a support element or block associated with said support base and extending in a substantially perpendicular direction to the support base, said support element being used for supporting the metacarpus of the individual during usage of the device,
   a vertical column associated with said horizontal support base extending in an essentially perpendicular direction from the support base and having a pulley allowing the sliding of a cord and fixed upright on said support base, the vertical column facing the support element and the hand when the device is in use;
   wherein said means for allowing the movement of one or more fingers of the hand is provided by at least the cord, the opposite ends of which are fixed, respectively, to a weight or a spring and at least an eyelet or ring, allowing the insertion of the finger and the wrist or the hand metacarpus, respectively;
   the support element further comprising:
   engagement means allowing to removably fix the support element to the support base and position the support element at a plurality of points on the support base, the support element being able to be positioned both longitudinally and transversely with respect to the support base, at a convenient distance from the vertical column,
   a central opening whereby said support element is formed with an arched bridge shape relative to the support plane for the passage of a cord when the support element is fixed to the support base by means of said engagement means, said central opening being suitable for the execution of movements of extension muscles of the fingers; and
   wherein said vertical column comprises a first hook and a second hook for fixing said spring on an opposite or on a same side as the cord with respect to the support element, said first hook being provided for carrying out exercises providing for the spring and the cord on the vertical reference plane and said second hook being provided for carrying out exercises providing for the spring and the cord on the horizontal reference plane.

2. Device according to claim 1, wherein said engagement means for positioning the support element on the support base comprises:
   two series of parallel holes on the support base suitable for receiving corresponding plugs provided on the support element and wherein the pitch between said holes is the same both in the longitudinal and transversal direction, allowing the support element to be positioned at a plurality of points on the support base by means of the plugs, both longitudinally and transversally, and at the convenient distance from the vertical column.

3. Device according to claim 1, wherein the support element has an ergonomic conformation comprising a side section profile shaped essentially as a wedge so as to allow a comfortable support of the hand metacarpus.

4. Device according to claim 1, wherein the device comprises a second support defined by a plate-shaped element fixable and removable with respect to the support base and located between the vertical column and the support element, said second support further comprising, at an upper portion, at least one groove having an essentially curvilinear profile suitable for housing or supporting the finger of the hand and allowing a movement of a single phalanx.

5. Device according to claim 1, wherein the support base comprises two portions hinged together, further having the vertical column hinged to said base, the device having a folded rest position and working position in which the vertical column is brought to a perpendicular position with respect to the support base.

6. Device according to claim 1, wherein said support element is equipped with an additional support plate attached to the support element by means of an elastic mechanism and wherein between said plate and the support element is provided a plurality of electric contacts being connected to an electric circuit that comprises a luminous or acoustic warning device being activated when said plurality of electric contacts interact.

7. Device according to claim 1, wherein the vertical column is removably fixed at a first end to the support base and extends in an essentially perpendicular direction from the support base, and the vertical column having a pulley at a second end, the pulley allowing the cord to move smoothly in a first direction and a second direction.

8. Device according to claim 1, wherein the support element supports the metacarpus to allow a forearm and a wrist of the user to be supported in a horizontal plane.

* * * * *